June 17, 1924.
W. F. FISHER
1,498,370
PROCESS OF MAKING MULTIFOCAL EYEGLASS LENSES
Filed May 12, 1920  2 Sheets-Sheet 1
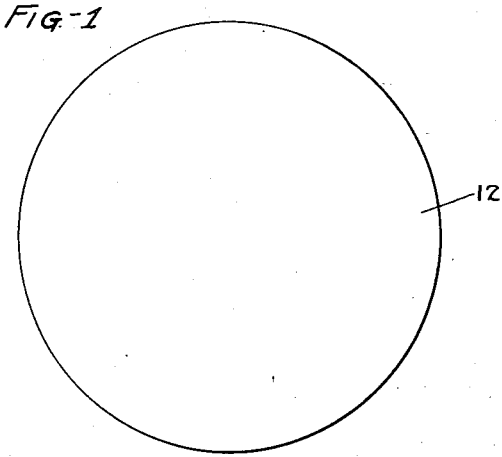
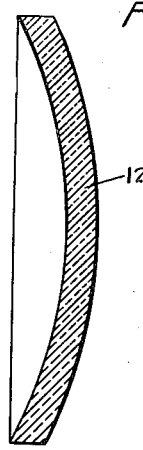
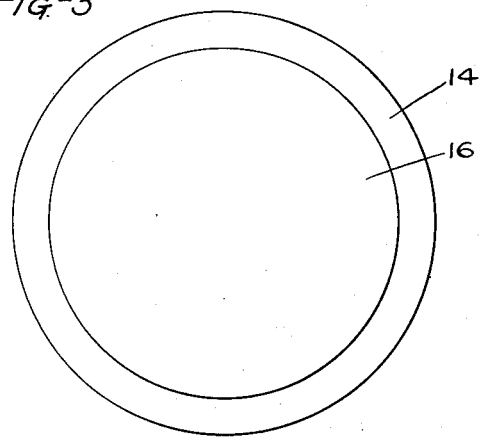
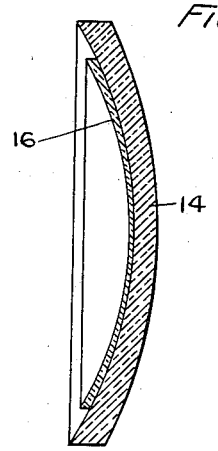
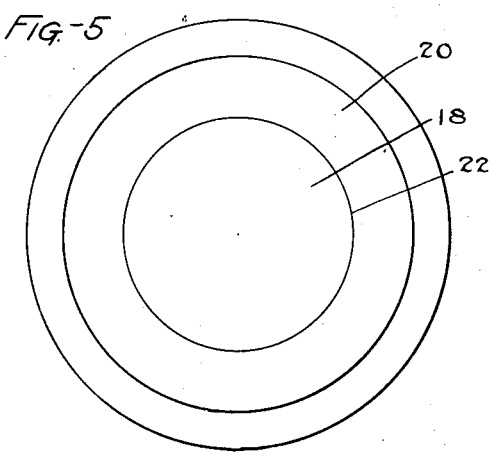
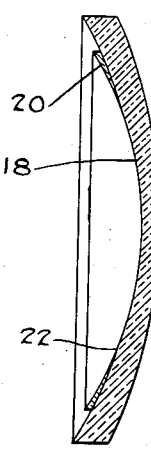
INVENTOR:
WILLIAM F. FISHER.
By Whiteley and Ruckman
ATTORNEYS.

June 17, 1924.

W. F. FISHER 1,498,370

PROCESS OF MAKING MULTIFOCAL EYEGLASS LENSES

Filed May 12, 1920     2 Sheets-Sheet 2

INVENTOR:
WILLIAM F. FISHER:
BY Whiteley and Ruckman
ATTORNEYS.

Patented June 17, 1924.

1,498,370

UNITED STATES PATENT OFFICE.

WILLIAM F. FISHER, OF MINNEAPOLIS, MINNESOTA.

PROCESS OF MAKING MULTIFOCAL EYEGLASS LENSES.

Application filed May 12, 1920. Serial No. 380,729.

*To all whom it may concern:*

Be it known that I, WILLIAM F. FISHER, a citizen of the United States, residing at Minneapolis, in the county of Hennepin and State of Minnesota, have invented certain new and useful Improvements in Processes of Making Multifocal Eyeglass Lenses, of which the following is a specification.

My invention relates to the process of making multifocal eye-glass lenses. An object is to provide a one-piece bifocal lens for myopic and other corrections in which one portion is ground in the other portion, the segment which is ground at the upper portion of the finished lens constituting the distance portion. Myopic corrections require minus lenses which are thickest at the outer edge. When lenses of this character are made with the segment on the bottom portion there is a large amount of prism to overcome in the reading portion of the lens, which has a tendency to weaken the inferior recti and superior oblique muscles which turn the eyes down, thus creating discomfort for the wearer in looking from distance vision to reading vision, and which also has a tendency to create double vision. I am able to overcome these difficulties by grinding the distance portion in the reading portion so that the segment comes in the upper portion of the lens with a fine hair line dividing the distance and reading portions. By making the bifocal lens in this manner there is no spherical aberration to cause discomfort to the wearer and the lens can be made of less weight than any other bifocal lens with which I am familiar.

The full objects and advantages of my invention will appear in connection with the detailed description thereof and the novel features embodied in my inventive idea will be particularly pointed out in the claims.

In the accompanying drawings,—

Figure 7:
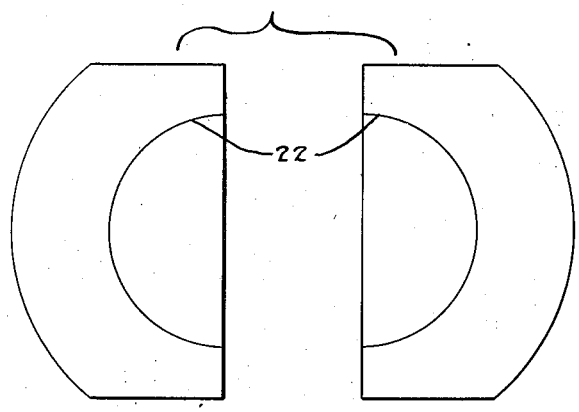
Figure 9:
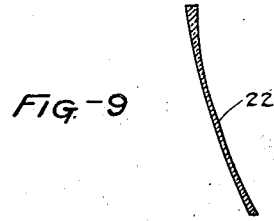
Figure 8:
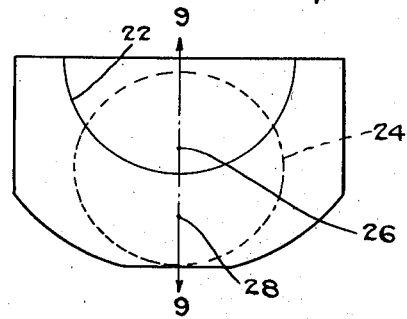
Figure 10:
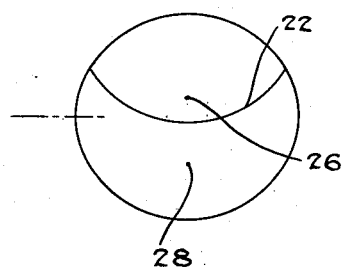

Fig. 1 is a plan view of a blank piece of optical glass. Fig. 2 is a view in central section through Fig. 1. Fig. 3 is a plan view showing the blank of Fig. 1 with an additional piece of glass cemented thereto. Fig. 4 is a view in central section through Fig. 3. Fig. 5 is a plan view showing the combined structure of Figs. 3 and 4 after grinding. Fig. 6 is a view in central section through Fig. 5. Fig. 7 is a plan view in which the product of Figs. 5 and 6 has been cut in half after removal of the additional piece of glass. Fig. 8 is a plan view of one of the halves shown in Fig. 7 after it has been ground on the convex side. Fig. 9 is a view in section on the line 9—9 of Fig. 8. Fig. 10 is a plan view of the finished lens.

In carrying out my invention I start with a concavo-convex blank 12 of optical glass such as shown in Figs. 1 and 2. I grind the concave side of this blank to the curvature called for by the prescription for the reading portion of the lens and thus produce the partly ground blank 14. I then grind the convex side of a concavo-convex piece of glass 16 so that it will fit upon the concave side of the ground blank 14 and secure the two pieces together as shown in Figs. 3 and 4, preferably by a cement that will stand heat or cold, so that the two pieces will be held securely together. I then grind a countersink through the piece 16 and into the concave face of the blank 14 in accordance with the curvature called for by the distance portion of the lens, thus producing the ground-out portion 18 in the blank 14 and reducing the piece 16 to the annular form shown at 20 and producing the hair line of separation 22 between the distance portion and the reading portion. The ring 20 which has served as a guide during the grinding operation is then detached and the partly ground blank is cut in two in well-known manner to produce the two halves shown in Fig. 7. I then grind the convex side of these two halves with the desired curvature as shown in Figs. 8 and 9, after which they are cut to the desired oval shape, as indicated on the dotted line 24 in Fig. 8, to produce the finished article shown in Fig. 10. The points 26 and 28 in Figs. 8 and 10 represent the center line of vision through the distance and reading portions respectively of the bifocal lens, and while these points remain the same distance from each other their position will be slightly shifted up or down according to variations in thickness of the finished lens at its upper edge.

The points 26 and 28 are at the thinnest points of the distance and reading portions respectively of the bifocal lens and, hence, constitute optical centers. It will be understood that the term "optical center" refers to a different thing from the term "geometrical center" The "geometrical center"

of a lens is that point in the lens which is equi-distant from all oppositely located points on the edge of the lens, while the "optical center" is the point of no prismatic effect and is in the thinnest part of a concave lens and in the thickest part of a convex lens or plus lens.

The advantages of my invention will be obvious from the foregoing description. Bifocal lenses for myopic and other corrections which will give a maximum amount of comfort to the wearer may be readily ground in accordance with the information contained on the prescription. The additional piece of glass which is secured to the partly ground blank serves as a guide in grinding the distance portion of the lens in the reading portion so that a fine hair line of separation is very accurately positioned between the two portions of the lens. It is obvious that my invention is particularly applicable to toric lenses.

I claim:

1. The process of making bifocal eye-glass lenses which consists in grinding one field in the concave face of a concavo-convex blank of optical glass, securing a guide-piece to said face, grinding away a portion of said guide-piece and into said previously-ground field to produce another field, removing said guide-piece, cutting the partly ground blank in two, and grinding the convex side to the desired curvature.

2. The process of making bifocal eye-glass lenses which consists in grinding the reading portion in the concave face of a concavo-convex blank of optical glass, securing a guide piece to said face, grinding away a portion of said guide piece and into said previously ground reading portion to produce the distance portion, removing said guide piece, cutting the partly ground blank in two, and grinding the convex side to the desired curvature.

3. The process of making bifocal eye-glass lenses which consists in grinding the reading portion in the concave face of a concavo-convex blank of optical glass, grinding the convex side of a concavo-convex piece of glass so that it will fit said ground concave face, cementing the two pieces together in centered position, grinding away a portion of said additional piece of glass and into said previously ground reading portion to produce the distance portion, removing the portion which remains of said additional piece of glass, cutting the partly ground blank in two, and grinding the convex side to the desired curvature.

In testimony whereof I hereunto affix my signature.

WILLIAM F. FISHER.